Oct. 30, 1951     S. T. HOLLAND     2,573,443
MIRROR SUPPORT
Filed Jan. 30, 1947
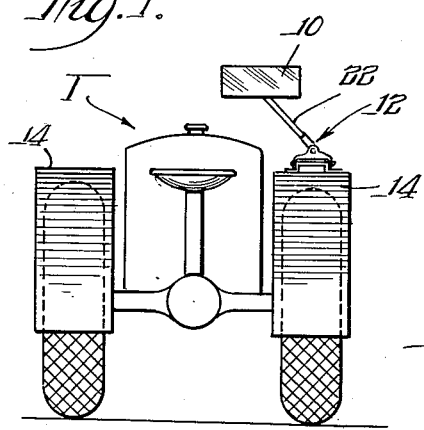
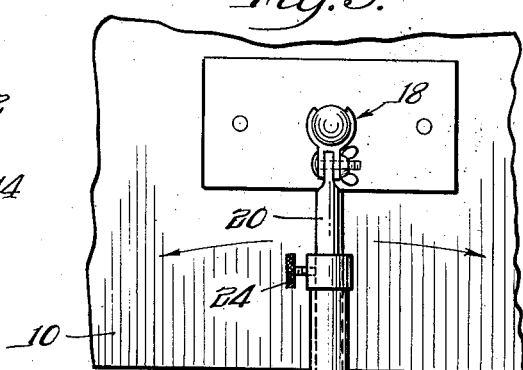
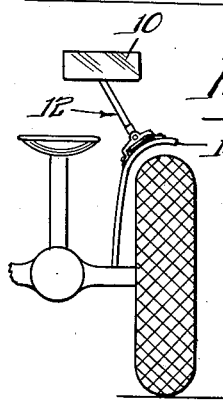
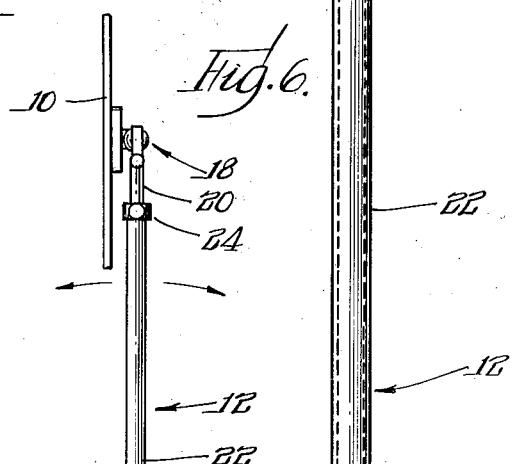
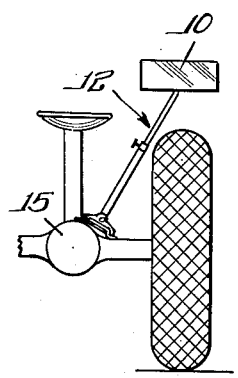
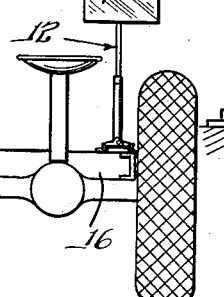
INVENTOR.
Stanley T. Holland
BY
Moore, Olson & Trexler
Attys.

Patented Oct. 30, 1951

2,573,443

UNITED STATES PATENT OFFICE 2,573,443

MIRROR SUPPORT

Stanley T. Holland, Mineral Point, Wis.

Application January 30, 1947, Serial No. 725,239

3 Claims. (Cl. 248—284)

1

This invention relates to rear view mirrors for vehicles, and particularly to the supporting devices for such mirrors.

An object of this invention is to provide an improved rear view mirror structure including an upright supporting stand for enabling the mirror to be mounted upon a tractor or like vehicle.

A further object is to provide a novel, simple and dependable rear view mirror construction which is capable of universal adjustment.

More specifically, my invention comprises, in its preferred embodiment, an extensible mirror stand having a universal mounting at its base and which may be adjusted forwardly or to the rear and sideways relative to the operator of the vehicle.

Various other objects, advantages and features of the invention will be apparent from the following specification when taken in connection with the accompanying drawing wherein a certain preferred embodiment is set forth for purposes of illustration.

In the drawing, wherein like reference numerals refer to like parts throughout:

Fig. 1 is a rear view of a tractor showing a mirror mounted thereon in accordance with the principles of the invention;

Figs. 2, 3 and 4 are fragmentary rear views similar to Fig. 1, but showing the mirror mounted on tractors of different types;

Fig. 5 is an elevational view of the mirror and its supporting structure, looking at the reverse side of the mirror; and Fig. 6 is a side elevation of the structure shown in Fig. 5.

The rear view mirror 10, in accordance with the principles of the invention, is supported by a stand 12 anchored to a convenient part of the vehicle. Thus, in the case of a tractor T having flat fenders 14 as shown in Fig. 1, the stand 12 may be mounted on one of these fenders. A similar arrangement may be utilized where the tractor has curved fenders as shown in Fig. 2. If the tractor has no fenders, the mirror stand 12 is mounted on the frame 15 or platform 16 of the vehicle as shown in Figs. 3 and 4, respectively.

Referring now to Figs. 5 and 6, the mirror 10 is coupled by a conventional ball-and-socket connection 18 to the upper end of an extensible arm 20 which is telescoped within an upright sleeve 22 of the stand 12. A set screw 24, or equivalent retaining device, on the sleeve 22 serves to hold the arm 20 in any extended position to which it may be adjusted. The lower end of the sleeve 22 is formed into a tongue 26 that is disposed between the upstanding legs of a bifurcated bearing member 28. A bolt or stud 30 is passed through the legs of the bearing 28 and the tongue 26, and a nut 32 is threaded on the bolt 30 to clamp the tongue between the legs, which are sufficiently yielding so that they may be tightened against the tongue 26 to hold the sleeve 22 and arm 20 in any selected angular position with respect to the bearing member 28.

The bearing member 28 has downwardly extending ears 34 which are pivotally connected to a stud 36 that is carried by a bracket 38 adapted to be mounted on a portion of the vehicle. Locking nuts 40 and 42 on the stud 36 serve to hold the bearing member 28 in any adjusted angular position about the pivot 36. The inner nuts 42 not only serve to secure the stud 36 in the U-shaped bracket 38 but also to space the arms or ears 34 away from the adjacent leg portions of the bracket 38. Thus, the arms 34 are clamped by the outer nuts 40 against the inner nuts 42 to secure the bearing bracket 28 in adjusted positions without bearing directly on the U-shaped bracket 38 so as to prevent bending thereof should excess pressure be applied to the outer nuts.

The bracket 38 is mounted on the vehicle with the stud or pivot pin 36 extending transverse of the longitudinal axis of the vehicle as shown in Figs. 1-4. Hence, the bearing member 28 and stand 12 may be swung about the pivot 36 (when the nuts 40 are loosened) to adjust the mirror 10 forwardly or backwardly relative to the driver of the vehicle. Sideward adjustment is obtained by loosening the nut 32 and swinging the stand 12 about the pivot 30. The length of the stand 12 is adjusted by loosening the set screw 24 and withdrawing or retracting the arm 20. Angularity of the mirror 10 relative to the stand 12 is conveniently adjusted by means of the ball-and-socket connection 18 which is connected to the arm 20 by a transverse pivot 19 disposed parallel to the stud 36 and extending at right angles to the bolt 30 so as to permit the connection 18 with the mirror to be shifted toward and away from the arm 20, thus permitting the lower edge of the mirror to be moved toward and away from the arm 20 for varied angular positions.

It will be appreciated from the foregoing that I have provided a novel and useful rear view mirror supporting device affording a variety of adjustments and which is particularly adapted for use in mounting a rear view mirror upon a tractor or similar vehicle. It should be noted that the leg portions of the U-shaped bracket 38 are relatively widely spaced, as are the arms 34 on the bearing bracket 28, so as to facilitate mounting of the entire assembly on or between angular surfaces, as shown in Figures 2 and 3. Obviously various changes may be made in the specific embodiment set forth for purposes of illustration without departing from the principles of the invention. The invention is accordingly not to be limited to the precise details disclosed herein but includes all modifications thereof within the spirit and scope of the appended claims.

The invention is hereby claimed as follows:

1. A device for supporting a rear view mirror on tractors and like vehicles, comprising an upright supporting arm, a sleeve within which said arm is telescoped, a ball-and-socket connection for the mirror and including a pivotal connection with the upper end of said arm enabling attachment thereof to the mirror, and universal adjustment means at the base of said sleeve enabling adjustment of the mirror both transversely and longitudinally of the vehicle, said last means including a bracket adapted to be mounted on the vehicle, a bearing member pivoted on said bracket for movement on an axis parallel with the axis of the pivotal connection between said mirror and said arm, and a pivotal connection between said bearing member and said sleeve.

2. A device for supporting a rear view mirror on tractors and like vehicles, comprising a substantially upright supporting member, means carried by said supporting member at the upper end thereof for attaching the mirror thereto, a U-shaped base bracket having relatively widely spaced leg portions adapted for attachment to the vehicle, a bearing bracket pivotally connected to the lower end of said supporting member and having relatively widely spaced arms disposed outwardly of the leg portions of said U-shaped bracket and spaced therefrom, pivot means connecting said U-shaped bracket with the arms of said bearing bracket, inner nut members on said pivot means spacing the arms of said bearing bracket from the adjacent portions of said U-shaped bracket, and outer clamping means cooperating with said pivot means for clamping the arms of said bearing bracket against said inner nut members to maintain said bearing bracket in adjusted positions thereof.

3. A device for supporting a rear view mirror on tractors and like vehicles, comprising a substantially upright supporting member, means carried by said supporting member at the upper end thereof for attaching the mirror thereto, a U-shaped base bracket having relatively widely spaced leg portions adapted for attachment to the vehicle, a bearing bracket pivotally connected to the lower end of said supporting member and having relatively widely spaced arms disposed outwardly of the leg portions of said U-shaped bracket and spaced therefrom, pivot means connecting said U-shaped bracket with the arms of said bearing bracket, pairs of inner and outer nut members disposed on said pivot means, said inner nut members serving to space the arms of said bearing bracket outwardly from the adjacent portions of said U-shaped bracket, said outer nut members serving to releasably clamp the arms of said bearing bracket against said inner nut members to maintain said bearing bracket in adjusted positions thereof.

STANLEY T. HOLLAND.

REFERENCES CITED

The following references are of record in the file of this patent:

UNITED STATES PATENTS

| Number | Name | Date |
|---|---|---|
| 2,113,251 | Dover | Apr. 5, 1938 |
| 2,137,440 | Boeve | Nov. 22, 1938 |
| 2,176,723 | Sauer | Oct. 17, 1939 |
| 2,237,282 | Reed | Apr. 1, 1941 |
| 2,353,588 | Ritz-Woller | July 11, 1944 |
| 2,393,056 | Noblitt et al. | Jan. 15, 1946 |
| 2,419,923 | Tolbert | Apr. 29, 1947 |
| 2,424,222 | Brown et al. | July 22, 1947 |